United States Patent
Rainnie et al.

(10) Patent No.: US 9,596,025 B1
(45) Date of Patent: Mar. 14, 2017

(54) METHOD FOR PROVIDING INTERNET ACCESS TO NETWORK DEVICES VIA A MOBILE PHONE

(71) Applicant: Marvell International Ltd., Hamilton (BM)

(72) Inventors: Hedley Rainnie, Santa Clara, CA (US); Chuong Vu, San Jose, CA (US); Eric Janofsky, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 622 days.

(21) Appl. No.: 13/942,172

(22) Filed: Jul. 15, 2013

Related U.S. Application Data (63) Continuation of application No. 13/532,357, filed on Jun. 25, 2012, now Pat. No. 8,489,059, which is a
(Continued)

(51) Int. Cl.
*H04B 1/16* (2006.01)
*H04B 1/04* (2006.01)
(Continued)

(52) U.S. Cl.
CPC ...... *H04B 7/2603* (2013.01); *H04W 52/0206* (2013.01); *H04W 88/04* (2013.01)

(58) Field of Classification Search
None
See application file for complete search history.

(56) References Cited

U.S. PATENT DOCUMENTS 6,735,450 B1 5/2004 Remmert
6,959,341 B1 10/2005 Leung
(Continued)

OTHER PUBLICATIONS

IEEE Std 802.3-2000 (Revision of IEEE Std 802.3, 2000 Edition) 802.3 IEEE Standard for Information Technology—Telecommunications and information exchange between systems—Local and metropolitan area networks—Specific requirements; Part 3: Carrier sense multiple access with collision detection (CSMAICD) access method and physical layer specifications; IEEE Computer Society, Sponsored by the LAN/MAN Standards Committee; Mar. 8, 2002; 26 page intro and table of contents; Section One: pp. 1-551.
(Continued)

*Primary Examiner* — Huy D Vu
*Assistant Examiner* — Hong Shao (57) ABSTRACT

A portable access point includes a first transceiver, a second transceiver, and a routing module. The first transceiver is configured to access an Internet via a mobile phone. The first transceiver is separate from the mobile phone. The first transceiver receives signals transmitted from the mobile phone to the portable access point. The signals contain content received from the Internet. The routing module is configured to route the content from the first transceiver to the second transceiver. The second transceiver is configured to (i) respectively establish wireless links between the portable access point and network devices, (ii) select a first network device of the network devices, and (ii) forward the content from the portable access point to the first network device on the wireless link respectively established between the portable access point and the first network device.

20 Claims, 5 Drawing Sheets

Related U.S. Application Data continuation of application No. 13/269,766, filed on Oct. 10, 2011, now Pat. No. 8,208,975, which is a continuation of application No. 12/711,577, filed on Feb. 24, 2010, now Pat. No. 8,036,721, which is a continuation of application No. 11/295,106, filed on Dec. 6, 2005, now Pat. No. 7,672,695.

(51) Int. Cl.
  *H04B 7/26* (2006.01)
  *H04W 52/02* (2009.01)
  *H04W 88/04* (2009.01)

(56) References Cited

U.S. PATENT DOCUMENTS

| | | | |
|---|---|---|---|
| 7,051,236 B2 | 5/2006 | Sanu | |
| 7,142,852 B2 | 11/2006 | Tell et al. | |
| 7,231,449 B2 | 6/2007 | Ellison et al. | |
| 7,317,896 B1 | 1/2008 | Saxena et al. | |
| 7,339,909 B2 | 3/2008 | Kotzin | |
| 7,352,731 B1 | 4/2008 | Leung | |
| 7,468,980 B1 * | 12/2008 | Casto | H04L 12/4625 370/338 |
| 7,672,695 B1 | 3/2010 | Rainnie et al. | |
| 7,778,230 B2 | 8/2010 | Fulknier et al. | |
| 8,036,721 B1 | 10/2011 | Rainnie et al. | |
| 8,072,994 B2 | 12/2011 | Moeller | |
| 8,085,743 B2 | 12/2011 | Buer et al. | |
| 8,208,975 B1 | 6/2012 | Rainnie et al. | |
| 8,228,885 B2 | 7/2012 | Buer et al. | |
| 8,340,068 B2 | 12/2012 | Buer et al. | |
| 8,489,059 B1 | 7/2013 | Rainnie et al. | |
| 2002/0044049 A1 * | 4/2002 | Saito | B60G 17/0185 340/438 |
| 2004/0224728 A1 | 11/2004 | Dacosta et al. | |
| 2005/0151640 A1 * | 7/2005 | Hastings | A61B 5/411 340/539.11 |
| 2005/0286476 A1 * | 12/2005 | Crosswy | H04M 1/7253 370/338 |
| 2006/0075269 A1 | 4/2006 | Liong et al. | |
| 2006/0128350 A1 * | 6/2006 | Hurwitz | H04W 68/12 455/343.2 |
| 2012/0113969 A1 | 5/2012 | Ishidoshiro | |
| 2012/0236770 A1 | 9/2012 | Yeh | |

OTHER PUBLICATIONS

IEEE Std 802.3-2000 (Revision of IEEE Std 802.3, 2000 Edition) 802.3 IEEE Standard for Information Technology—Telecommunications and information exchange between systems—Local and metropolitan area networks—Specific requirements; Part 3: Carrier sense mUltiple access with collision detection (CSMAICD) access method and physical layer specifications; IEEE Computer Society, Sponsored by the LAN/MAN Standards Committee; Mar. 8, 2002; Section Two: pp. 1-581.

IEEE Std 802.3-2000 (Revision of IEEE Std 802.3,2000 Edition) 802.3 IEEE Standard for Information Technology—Telecommunications and information exchange between systems—Local and metropolitan area networks—Specific requirements; Part 3: Carrier sense multiple access with collision detection (CSMAICD) access method and physical layer specifications; IEEE Computer Society, Sponsored by the LAN/MAN Standards Committee; Mar. 8, 2002; Section Three, pp. 1-379.

IEEE Std 802.16/2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniques!Society; Oct. 1, 2004; 893 pages.

ISOIIEC 8802-11—ANSI/IEEE Std 802.11 First edition 1999-00-00—Information technology—Telecommunications and information exchange between systems—Local and metropolitan area networks—Specific requirements—Part 11: Wireless LAN Medium Access Control (MAC) and Physical Layer (PHY) specifications. 531 Pages.

* cited by examiner

METHOD FOR PROVIDING INTERNET ACCESS TO NETWORK DEVICES VIA A MOBILE PHONE

CROSS-REFERENCE TO RELATED APPLICATIONS

This present disclosure is a continuation of U.S. patent application Ser. No. 13/532,357 (now U.S. Pat. No. 8,489,059), filed Jun. 25, 2012, which is a continuation of U.S. patent application Ser. No. 13/269,766 (now U.S. Pat. No. 8,208,975), filed Oct. 10, 2011, which is a continuation of U.S. patent application Ser. No. 12/711,577 (now U.S. Pat. No. 8,036,721) filed on Feb. 24, 2010, which is a continuation of U.S. patent application Ser. No. 11/295,106 (now U.S. Pat. No. 7,672,695), filed Dec. 6, 2005. The entire disclosures of the applications referenced above are incorporated herein by reference.

FIELD

The present disclosure relates to access points for networks, and more particularly to portable access points.

BACKGROUND

Figure 1:
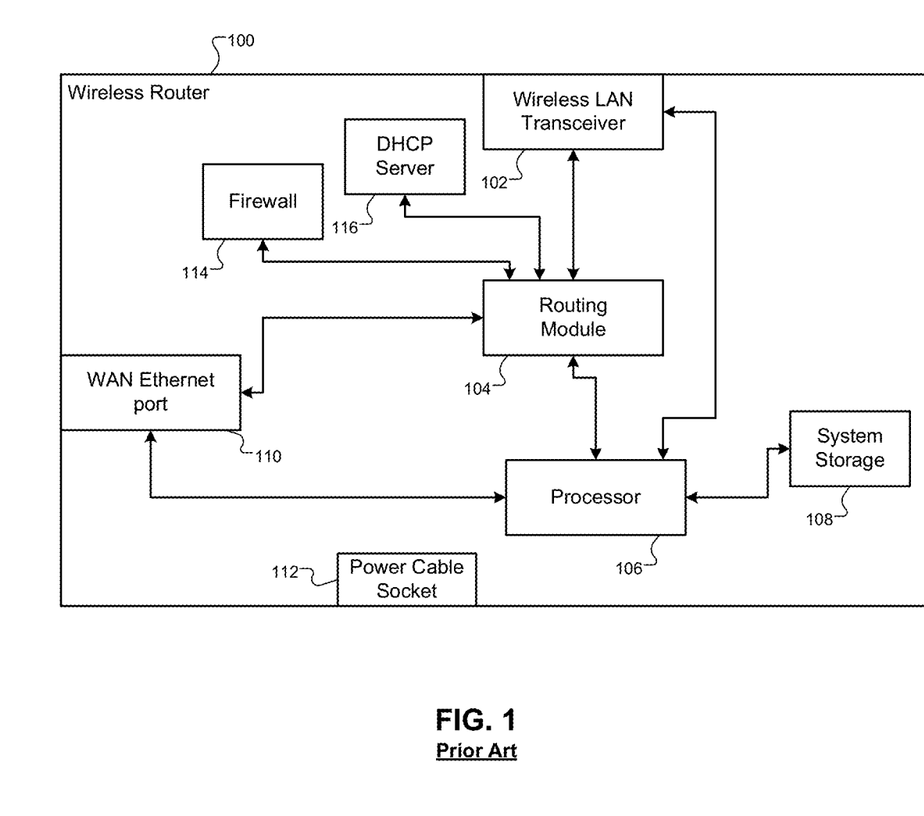
FIG. 1 is a functional block diagram of a wireless router according to the prior art.

Referring now to FIG. 1, a functional block diagram of a wireless router 100 according to the prior art is presented. The wireless router 100 includes a wireless LAN (Local Area Network) transceiver 102, which uses IEEE 802.11 to communicate with multiple wireless client devices (not shown). The wireless LAN transceiver 102 communicates with a routing module 104 and with a processor 106. The processor 106 communicates with system storage 108 and with a WAN (Wide Area Network) Ethernet port 110, which provides an RJ-45 connector for connecting to a cable modem, DSL (Digital Subscriber Line) modem, or any other suitable WAN connection. The wireless router 100 is powered via a power cable socket 112 that receives power from an electrical outlet, usually through a transformer (not shown).

The routing module 104 also communicates with a firewall 114 and a DHCP (Dynamic Host Configuration Protocol) server 116. The routing module 104 communicates packets between the WAN Ethernet port 110 and the wireless LAN transceiver 102, subject to firewall 114 restrictions. The firewall 114 protects against malicious traffic, and may also allow for parental control. The routing module 104 can also send packets between wireless devices communicating with the wireless LAN transceiver 102. The DHCP server 116 answers requests received by the wireless LAN transceiver 102 for IP (Internet Protocol) addresses. These IP addresses are dynamically assigned to wireless devices as they attempt to connect to the wireless router 100.

The firewall 114 may also provide NAT (Network Address Translation) capability for sharing a common IP address among the multiple wireless devices communicating with the wireless LAN transceiver 102. The processor 106 controls operation of the wireless LAN transceiver 102, the routing module 104, system storage 108, the WAN Ethernet port 110, the firewall 114, and the DHCP server 116. The processor 106 retrieves instructions from system storage 108, and may also store operating parameters in system storage 108. The processor 106 may also function as a web server to provide a convenient interface to client devices for updating various settings of the wireless router 100. The firewall 114 and DHCP server 116 may be implemented as functions of the processor 106.

SUMMARY

A portable access point is provided and includes a first transceiver, a second transceiver, and a routing module. The first transceiver is configured to access an Internet via a mobile phone. The first transceiver is separate from the mobile phone. The first transceiver receives signals transmitted from the mobile phone to the portable access point. The signals contain content received from the Internet. The routing module is configured to route the content from the first transceiver to the second transceiver. The second transceiver is configured to (i) respectively establish wireless links between the portable access point and network devices, (ii) select a first network device of the network devices, and (ii) forward the content from the portable access point to the first network device on the wireless link respectively established between the portable access point and the first network device.

In other features, a method is provided and includes accessing an Internet at a first transceiver and via a mobile phone including receiving signals at the first transceiver transmitted from the mobile phone to a portable access point. The first transceiver is separate from the mobile phone. The signals contain content received from the Internet. The content is routed from the first transceiver to a second transceiver. The method further includes, at the second transceiver, (i) respectively establishing wireless links between the portable access point and network devices, (ii) selecting a first network device of the network devices, and (iii) forwarding the content from the portable access point to the first network device on the wireless link respectively established between the portable access point and the first network device.

In other features, a portable access point is provided and includes a wireless LAN transceiver that is capable of establishing Ethernet wireless links with wireless client devices, respectively. A wireless WAN transceiver establishes an Ethernet data connection with an Internet Service Provider (ISP), receives and forwards Ethernet data packets from at least one of the wireless client devices to the ISP and receives and forwards Ethernet data packets from the ISP to the one of the wireless client devices. A routing device routes Ethernet data packets between the wireless LAN transceiver and the wireless WAN transceiver. A control module controls operation of the wireless LAN transceiver and the wireless WAN transceiver. A first storage device stores operating system and application instructions for the control module.

In other features, a charging connection provides power from the power source to an external battery-powered device. The wireless LAN transceiver includes a sleep mode that stops transmission and waits for a resume signal to be received, and where the control module places the wireless LAN transceiver in the sleep mode to conserve power. The control module places the wireless LAN transceiver in the sleep mode when packets have not been received at the wireless LAN transceiver for a first period of time.

In further features, the control module monitors a state of charge of the power source, the first period of time varying in accordance with the state of charge. The control module monitors a state of the power source to determine a power saving feature level. A second storage device is used for storing at least one of backup data and media information. The second storage device includes a universal file system to allow the second storage device to appear as a removable storage device to the wireless devices.

In still other features, the wireless WAN transceiver includes a Bluetooth transceiver operable to communicate with a Bluetooth mobile phone that can establish a data service with the ISP. The wireless WAN transceiver includes a digital cellular transceiver operable to communicate with the ISP via a data service of a mobile telephony service provider. A belt clip permits wearing of the portable access point. A firewall protects the wireless devices from malicious activity. The firewall provides Network Address Translation (NAT) for the wireless devices. A DHCP server leases Internet Protocol (IP) addresses to the wireless devices.

In other features, an expansion port is operable for connecting to a headset. The expansion port is operable for connecting to physiological sensors. The physiological sensors include at least one of a thermometer, a blood glucose meter, a blood pressure monitor, a stethoscope, a pedometer, an ECG recorder, and an EEG recorder. The expansion port includes at least one analog to digital converter for converting analog physiological data to a digital format. The expansion port includes at least one preamplifier to boost a signal level from one of the physiological sensors.

In further features, a Global Positioning System receiver determines a physical location of the portable access point, where the control module is operable to transmit the physical location to a remote site when an alarm condition is detected. A display displays information pertaining to collected data from the physiological sensors. An input device accepts input from the input device to determine when to sample data from the physiological sensors. A web server module provides a secure web interface to authorized users for accessing collected data from the physiological sensors.

In still other features, the control module receives media information, and at least one of records and streams the media information. Media information is received from the satellite radio tuner and the AM/FM tuner. An audio port is operable to connect to at least one of headphones and a stereo system. The portable access point also includes a microphone, a speaker, an input device that receives information including telephone numbers, and a display for displaying the telephone numbers and call status. Wired ports communicate with wired network devices.

A portable access point includes providing mobile access point that supports a wireless local area network (LAN) and a wide area network; selectively establishing Ethernet wireless links with remote wireless client devices, respectively; selectively establishing an Ethernet data connection with a remote Internet Service Provider (ISP); receiving and forwarding Ethernet data packets from at least one of the wireless client devices to the ISP; receiving and forwarding Ethernet data packets from the ISP to the one of the wireless client devices; routing packets between the wireless LAN and the wireless WAN; controlling operation of the wireless LAN and the wireless WAN; and storing operating system and application instructions.

In other features, the method further includes providing power to an external battery-powered device. The method further includes operating in a sleep mode until a resume signal is received from one of the wireless devices.

In further features, operating in sleep mode is performed when packets have not been received from the wireless devices for a first period of time. Operating in sleep mode includes monitoring a state of charge and varying the first period of time in accordance with the state of charge. The method further includes monitoring a state of charge to determine a power saving feature level. The method further includes storing at least one of backup data and media information.

In still other features, the method where the establishing includes communicating with a mobile phone capable of establishing a data service with the ISP. Establishing includes communicating directly with a data service of a mobile telephony service provider. The method further includes protecting the wireless devices from malicious activity. The method further includes providing Network Address Translation (NAT) to the wireless devices. The method further includes providing IP address leases to the wireless devices.

In still further features, the method further includes receiving data from physiological sensors. The physiological sensors include at least one of a thermometer, a blood glucose meter, a blood pressure monitor, a stethoscope, a pedometer, an ECG recorder, and an EEG recorder. The method further includes converting analog physiological data into a digital format. The method further includes boosting a signal level from one of the physiological sensors.

In other features, the method further includes determining a physical location and transmitting the physical location to a remote site when an alarm condition is detected. The method further includes displaying information pertaining to collected data from the physiological sensors. The method further includes accepting input to determine when to sample data from the physiological sensors. The method further includes providing a secure web interface to authorized users for accessing collected data from the physiological sensors.

In further features, the method further includes receiving media information, and at least one of recording and streaming the media information. Receiving includes receiving media information from a satellite radio tuner. Receiving includes receiving media information from an AM/FM tuner.

A portable access point includes wireless LAN transceiving means for establishing Ethernet wireless links with wireless client devices, respectively. Wireless WAN transceiving means establishes an Ethernet data connection with an Internet Service Provider (ISP), receives and forwards Ethernet data packets from at least one of the wireless client devices to the ISP and receives and forwards Ethernet data packets from the ISP to the one of the wireless client devices. Routing means routes Ethernet data packets between the wireless LAN transceiving means and the wireless WAN transceiving means. Control means controls operation of the wireless LAN transceiving means and the wireless WAN transceiving means. Storing means stores operating system and application instructions for the control means.

In other features, charging means provides power from the charge storage means to an external battery-powered device. The wireless LAN transceiving means includes a sleep mode that stops transmission and waits for a resume signal to be received, and where the control means places the wireless LAN transceiving means in the sleep mode to conserve power. The control means places the wireless LAN transceiving means in the sleep mode when packets have not been received at the wireless LAN transceiving means for a first period of time.

In further features, the control means monitors a state of charge of the charge storage means, the first period of time varying in accordance with the state of charge. The control means monitors a state of the charge storage means to determine a power saving feature level. Second storage means stores at least one of backup data and media information. The second storage means includes universal file means for allowing the second storage means to appear as a removable device to the wireless devices.

In still other features, the wireless WAN transceiving means includes Bluetooth transceiving means for communicating with Bluetooth mobile means for establishing a data service with the ISP. The wireless WAN transceiving means includes digital cellular means for communicating with the ISP via a data service of a mobile telephony service provider. Belt clip means allows wearing of the portable access point. Firewall means protects the wireless devices from malicious activity. The firewall means provides Network Address Translation (NAT) for the wireless devices. DHCP means leases Internet Protocol (IP) addresses to the wireless devices.

In still further features, expansion port means connects to a stereo system. Expansion port means connects to a headset. Expansion port means receives data from physiological sensors. The physiological sensors include at least one of a thermometer, a blood glucose meter, a blood pressure monitor, a stethoscope, a pedometer, an ECG recorder, and an EEG recorder. The expansion port means includes at least one analog to digital converting means for converting analog physiological data to a digital format. The expansion port means includes at least one preamplifying means for boosting a signal level from one of the physiological sensors.

In other features, Global Positioning System means determines a physical location of the portable access point, where the control means is operable to transmit the physical location to a remote site when an alarm condition is detected. Display means displays information pertaining to collected data from the physiological sensors on the display means. Input means accepts input to determine when to sample data from the physiological sensors. Web server means provides a secure web interface to authorized users for accessing collected data from the physiological sensors.

In further features, the control means receives media information, and at least one of records and streams the media information. Satellite radio tuning means receives satellite radio media information. AM/FM tuning means receives AM/FM media information. Audio port means connects to at least one of headphones and a stereo system. The portable access point also includes microphonic means for receiving audio information, speaker means for producing audio information, input device means for receiving user information including telephone numbers, and display means for displaying the telephone numbers and call status. Wired LAN means communicates with wired network devices.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DESCRIPTION

The following description of the preferred embodiments is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
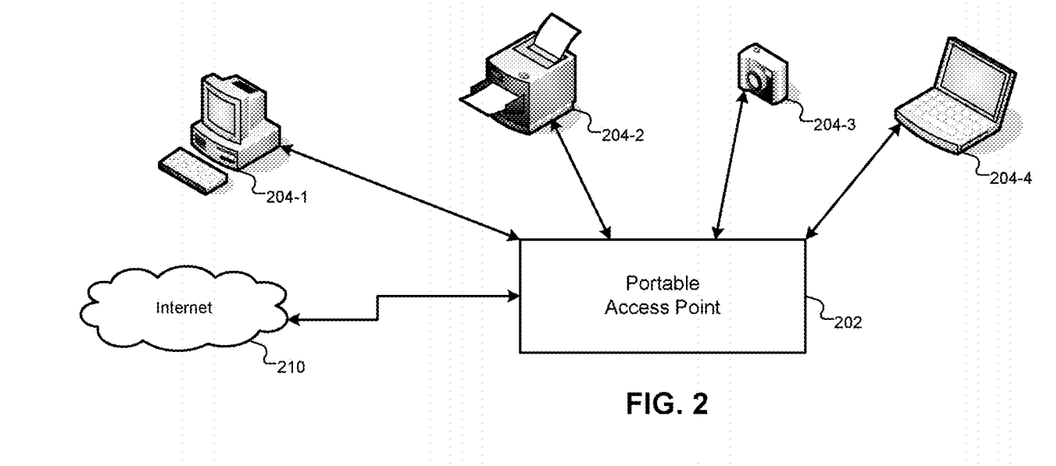
FIG. 2 is a functional block diagram of an exemplary system according to the principles of the present disclosure.

Referring now to FIG. 2, a functional block diagram of an exemplary system according to the principles of the present disclosure is presented. A portable access point 202 is shown communicating with various client devices 204. Device 204-1 may be a personal computer, device 204-2 may be a printer device, device 204-3 may be a digital camera, and device 204-4 may be a laptop computer. Additional or fewer devices may be connected to the portable access point 202, and may be of many different types. The portable access point 202 communicates with the Internet, represented graphically at 210, via an Internet Service Provider. The portable access point 202 may communicate with the Internet 210 via GPRS (General Packet Radio Service), CDMA2000 (indicating a 3G service using Code Division Multiple Access), UMTS (Universal Mobile Telecommunications System), WiMax or I.E.E.E. 802.16, which is hereby incorporated by reference in its entirety, Evolution Data Optimized (EVDO) broadband wireless access based on 3G, or any other suitable wide area network mechanism.

Figure 3:
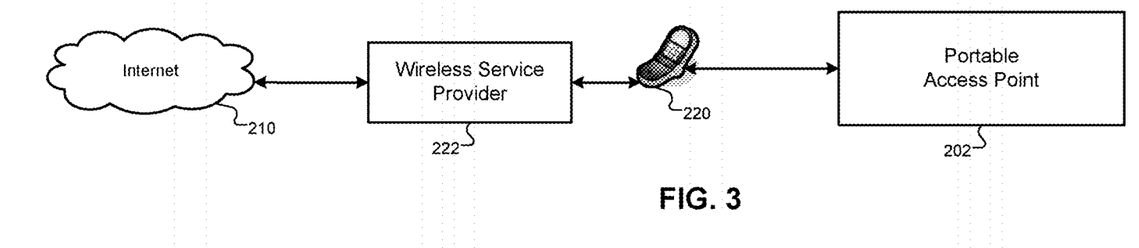
FIG. 3 is a functional block diagram of an alternative exemplary system according to the principles of the present disclosure.

Alternately, the portable access point 202 may communicate with the Internet 210 via the scheme depicted in FIG. 3. In FIG. 3, the portable access point 202 communicates with a mobile phone 220 via a short-range wireless protocol such as Bluetooth. Alternately, a physical connection could be established between the mobile phone 220 and the portable access point 202. The mobile phone 220 communicates with a wireless service provider 222, which in turn communicates with the Internet 210. The portable access point 202 uses the mobile phone 220 as a data service conduit to the wireless service provider 222.

Referring again to FIG. 2, the portable access point 202 allows the wireless devices 204 to communicate with each other, and to communicate with hosts on the Internet 210. The portable access point 202 may provide IP addresses via DHCP to the wireless devices 204. The portable access point 202 may also include NAT capability to allow an IP address visible to the Internet 210 to be shared by the wireless devices 204. The portable access point may also include a firewall to protect the devices 204 from malicious activity, and may include a web server for easy configuration of the portable access point 202.

The portable access point 202 may further include storage such that media and/or data information can be stored in the portable access point 202. This information may include pictures from the digital camera 204-3 or backup files from the laptop computer 204-4. The information may also include recorded or downloaded audio/video content and/or physiological information, discussed in further detail below. The portable access point 202 is powered by a portable power source, such as a battery. Solar power or a hand crank may also provide power to the portable access point 202. The portable access point 202 may be configured so as to be worn on a user's belt, placed in a briefcase, or located in a purse.

Figure 4:
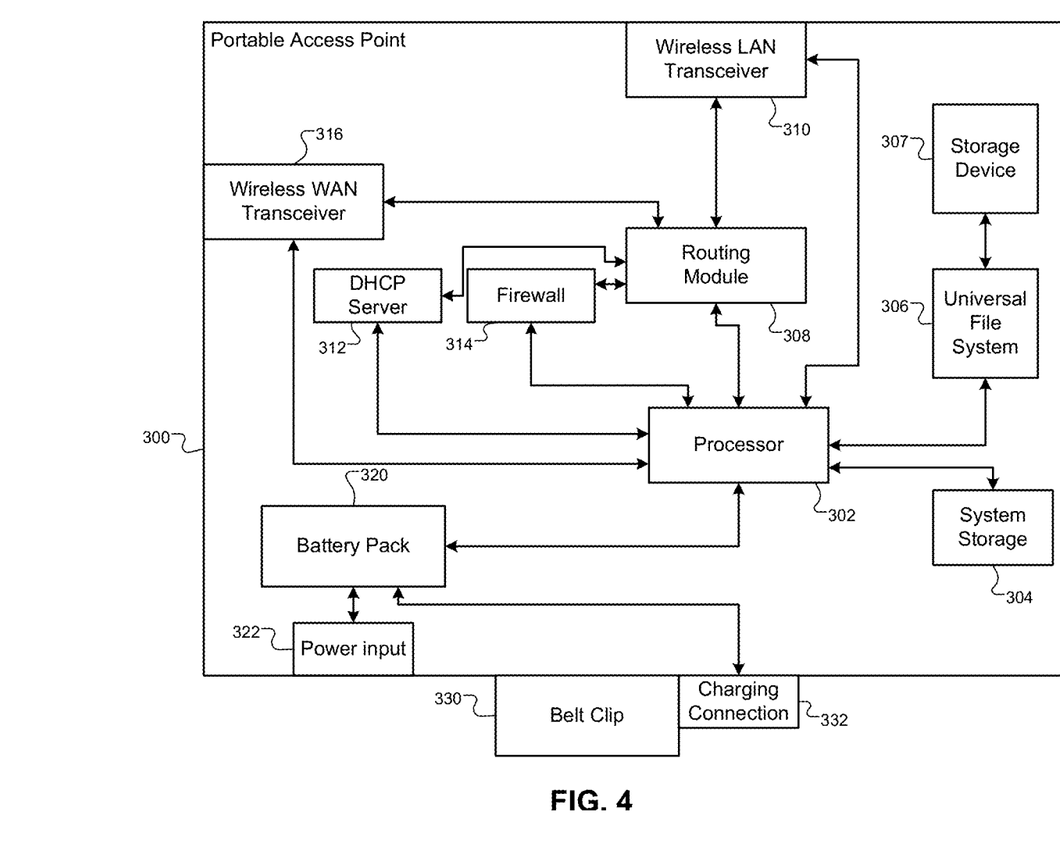
FIG. 4 is a functional block diagram of an exemplary implementation of a low-power portable access point according to the principles of the present disclosure.

Referring now to FIG. 4, a functional block diagram of an exemplary implementation of a low-power portable access point 300 according to the principles of the present disclosure is presented. The portable access point 300 includes a processor 302 that communicates with system storage 304. The system storage 304 includes instructions for the processor 302, and also includes operating parameters. Based on instructions from system storage 304, which may include an operating system and application programs, the processor 302 directs operation of a routing module 308, a wireless LAN transceiver 310, a DHCP server 312, a firewall 314, a wireless WAN transceiver 316, and a battery pack 320. The routing module 308 communicates with the DHCP server 312, the firewall 314, the wireless WAN transceiver 316, the wireless LAN transceiver 310, and the processor 302.

The wireless LAN transceiver 310 can communicate with multiple wireless devices (not shown) via a wireless networking protocol, such as IEEE 802.11, proprietary extensions of IEEE 802.11, and/or other suitable wireless networking protocols. The wireless WAN transceiver 316 establishes a connection to the Internet (not shown) as discussed in FIGS. 2 and 3. In the implementation of FIG. 2, the wireless WAN transceiver 316 may implement a suitable wireless packet data protocol such as GPRS, CDMA2000, and/or UMTS. In the implementation of FIG. 3, the wireless WAN transceiver 316 may implement a Bluetooth (or other suitable short range wireless network) protocol to communicate with a data-enabled mobile phone. Alternately, the wireless WAN transceiver 316 may be replaced with a wired connection to the mobile phone.

The routing module 308, as controlled by the processor 302, allows packets to be communicated among and between wireless devices connected to the wireless LAN transceiver 310 and the Internet via the wireless WAN transceiver 316. Additionally, the routing module 308 may route packets to and from an optional wired network connection (not shown), such as Ethernet. The DHCP server 312 assigns IP addresses to wireless devices requesting such addresses through the wireless LAN transceiver 310. The processor 302 may also be capable of requesting a DHCP lease from the ISP (Internet Service Provider) via the wireless WAN transceiver 316. The routing module 308 communicates with the DHCP server 312, the firewall 314, the wireless WAN transceiver 316, the wireless LAN transceiver 310, and the processor 302.

The firewall 314 protects wireless devices connected to the wireless LAN transceiver 310 from malicious activity, and may also filter malicious activity originating from the wireless devices. The firewall 314 may implement other functions such as parental controls, intrusion detection, MAC (Media Access Control) filtering, URL (Uniform Resource Locator) filtering, time/date restrictions, and IP address filtering. The firewall 314 may further offer Network Address Translation (NAT) capability to allow the wireless devices to share a single Internet-visible IP address. The portable access point 300 may be configured to attach to a user's belt via a belt clip 330. An optional charging connection 332 may be adjacent to, or integrated with, the belt clip 330. The charging connection 332 allows another device to be charged from the battery pack 320. This device may be a mobile telephone, a PDA, or any other battery-powered device.

The processor 302 communicates with a universal file system 306, which in turn communicates with a storage device 307. The universal file system 306 allows the portable access point 300 to be connected to any wired or wireless client device (e.g., desktop or laptop computer) running any major operating system (e.g., Windows, MacOS, Linux. OpenBSD, etc.). The universal file system 306 can make the storage device 307 appear as a removable storage device to the client operating system. The user can then easily transfer multimedia files (data/audio/video) between the portable access point 300 and the remote device via standard file transfer operations such as drag-and-drop.

The battery pack 320 communicates with a power input 322, to which a user of the portable access point 300 can connect a power source to charge the battery pack 320. The processor 302 may direct charging of the battery pack 320, or the battery pack 320 may have built-in circuitry that controls its charging. The processor 302 may also be able to monitor the charge remaining in the battery pack 320 and/or modulate its output voltage. The battery pack 320 provides power to the modules within the portable access point 300. The battery pack 320 may operate in conjunction with buck or boost converters (DC to DC) to provide various voltages to different modules. The power input 322 may accept the output of a transformer, or may accept mains voltages (such as 125V 60 Hz AC) so that an outboard transformer does not need to be carried.

The processor 302 controls power consumption to maximize the operating time from the battery pack 320. The processor 302 may monitor a state of the battery pack 320 to determine how aggressively to implement power saving features. One such feature is to either power down or place a module in a sleep mode. This decision may be made based on the length of time since the module was last used. The length of time may vary in accordance with the state of charge of the battery pack 320; i.e., when the battery pack 320 has less charge, a module is powered down after a shorter period of time.

For instance, the processor 302 may power down the wireless WAN transceiver 316 when packets have not been communicated to the Internet for a period of time. If incoming connections from the Internet are expected, the wireless WAN transceiver 316 may also support a sleep mode whereby the wireless WAN transceiver 316 awaits a wake signal from the WAN. Alternately, the processor may power down the wireless WAN transceiver 316 when the firewall 314 determines there are no open TCP (Transmission Control Protocol) connections between the wireless devices and the Internet.

The processor 302 may also place the wireless LAN transceiver 310 in sleep mode when packets have not been received at the wireless LAN transceiver for a period of time. The wireless LAN transceiver 310 may be in a sleep mode until it receives a wake-up signal from a wireless device. In sleep mode, the wireless LAN transceiver 310 does not need to perform any transmission or decoding; only the receiver must be powered.

If the system storage module 304 is not being used, it can be directed to go into a sleep mode where it draws only enough power to maintain its contents. A storage technology such as flash RAM would require no power to maintain its state. The DHCP server 312 and firewall 314 may be implemented as functions of the processor 302, and the processor 302 may cease executing these functions to conserve power. The processor 302 may reduce its operating frequency, or may itself enter into a sleep mode. In such a sleep mode, the processor 302 would wait for a wake signal to be received from the wireless LAN transceiver 310. Additionally the portable access point 300 may have an on/off switch to allow all functions to be turned off to save power.

Figure 5:
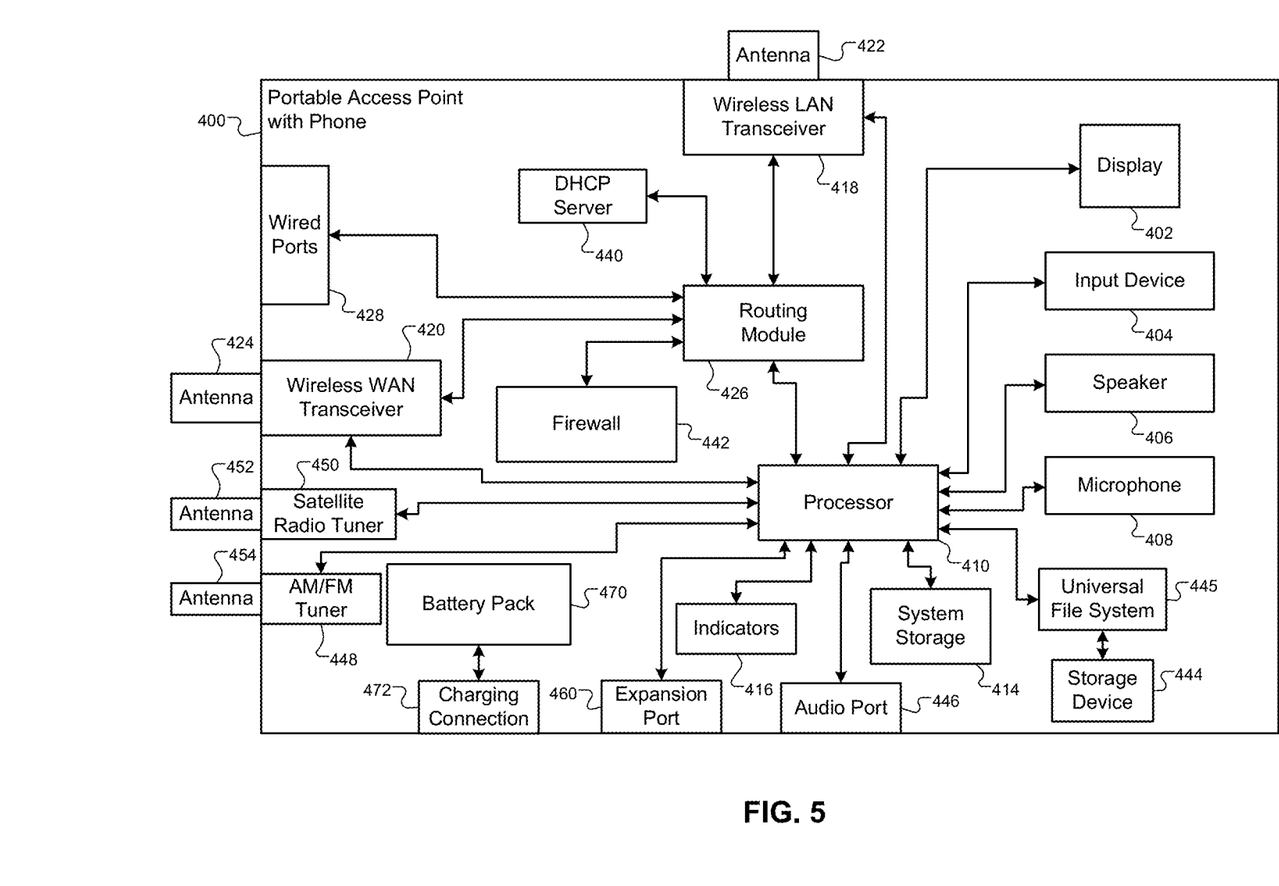
FIG. 5 is a functional block diagram of an exemplary implementation of a more richly featured portable access point according to the principles of the present disclosure.

Referring now to FIG. 5, a functional block diagram of an exemplary implementation of a more richly featured portable access point 400 according to the principles of the present disclosure is presented. In this example, portable access point 400 includes mobile phone capability, which uses a display 402 to communicate information to a user, an input device 404 to receive information such as phone numbers from the user, a speaker 406 to provide audio information to the user, and a microphone 408 to receive audio information, such as the user's voice. A processor 410 controls the display 402, the input device 404, the speaker 406, and the microphone 408, using an operating system and applications retrieved from a system storage module 414.

The display 402 may include a LCD (Liquid Crystal Display) or LED (Light Emitting Diode) display, may be color, and may be capable of full-motion video. The display 402 may display dialed telephone numbers and/or call status. The input device 404 may include buttons, a touchpad, scroll wheels, and/or a touch screen. The speaker 406 may include a DAC (Digital to Analog Converter) and/or an amplifier. The microphone 408 may include an ADC (Analog to Digital converter) and/or an amplifier.

The processor 410 may also communicate information to the user via a set of indicators 416. These indicators may display the status of a wireless LAN transceiver 418 or a wireless WAN transceiver 420. The wireless LAN transceiver 418 is capable of communicating with wireless devices and may attach to an external antenna 422, which may or may not be removable. The wireless WAN transceiver 420 communicates with a mobile telephone service provider that offers data service and may attach to an external antenna 424, which may or may not be removable. A routing module 426 allows packets to be directed between and among devices communicating with the wireless LAN transceiver 418 and the wireless WAN transceiver 420. The routing module 426 may also route to one or more wired ports 428 for connecting to devices with a wired LAN capability, such as Ethernet (IEEE 802.3).

A DHCP server 440 and a firewall 442 communicate with the routing module 426. The DHCP server 440 provides IP addresses (in the form of a DHCP lease) to wireless devices connecting to the wireless LAN transceiver 418 or to devices connecting to the wired ports 428. The firewall 442 filters packets and protects the wired and wireless devices from malicious activity. The processor 410 communicates with a storage device 444 that is capable of storing media information and/or user data. The media information may have originated from a variety of sources, such as on-board recording, or uploading from a user device such as a computer or media player. This content may be downloaded to wireless devices, or provided as streaming content by the processor 410. In addition, the processor 410 may provide such content to the display 402, the speaker 406, or an audio port 446. The processor accesses the storage device 444 via a universal file system module 445, as described above with respect to FIG. 4.

The audio port 446 may allow the connection of headphones or may allow connection of the portable access point 400 to a stereo system. The portable access point 400 may also include an AM/FM tuner 448 and/or a satellite radio tuner 450, either or both of which may utilize external antennas, represented as 452 and 454, respectively. The processor 410 directs the tuning of the AM/FM and satellite radio tuners 448 and 450, and may stream their media to wireless devices via the wireless LAN transceiver 418 or may store their content in the storage device 444 for later upload or playback.

An expansion port 460 allows the portable access point 400 to communicate with additional devices, such as a headset, an automobile phone connection, or physiological sensors as discussed below. A battery pack 470 provides power to the portable access point 400. The battery pack 470 can be charged by a power cord connected from a mains receptacle to a charging connection 472. The charging connection 472 may receive a DC voltage that is appropriate for charging the battery pack 470, or may have to transform incoming AC or DC into an appropriate DC voltage for the battery pack 470.

Figure 6:
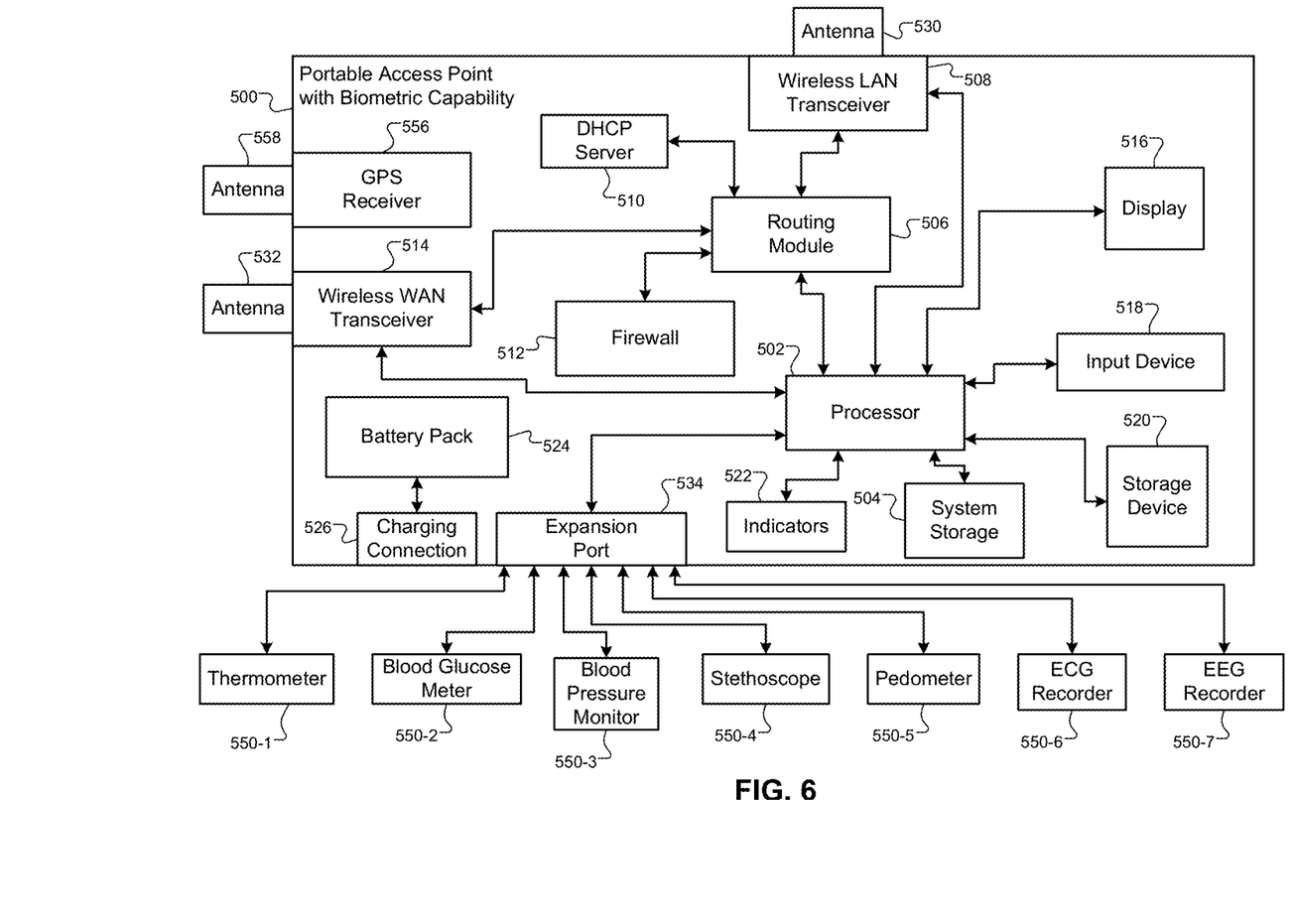
FIG. 6 is a functional block diagram of an exemplary portable access point tailored to physiological monitoring applications according to the principles of the present disclosure.

Referring now to FIG. 6, a functional block diagram of an exemplary portable access point 500 tailored to physiological monitoring applications according to the principles of the present disclosure is presented. The portable access point 500 includes a processor 502, system storage 504, a routing module 506, a wireless LAN transceiver 508, a DHCP server 510, a firewall 512, a wireless WAN transceiver 514, a display 516, an input device 518, a storage device 520, indicators 522, a battery pack 524, a charging connection 526, and optional antennas 530 and 532, all of which operate similarly to modules described above with respect to FIG. 5. In addition, the storage device 520 may incorporate a universal file system, described above with respect to FIG. 4.

The portable access point 500 contains an expansion port 534 which is adapted to be connected to various physiological sensors and recorders 550. These sensors can include a thermometer 550-1, a blood glucose meter 550-2, a blood pressure monitor 550-3, a stethoscope 550-4, a pedometer 550-5, an ECG (Electrocardiogram) recorder 550-6, and an EEG (Electroencephalogram) recorder 550-7. Many other types of physiological sensors can be connected, including but not limited to, mass sensors (such as digital scales), pulse oximeters (for measuring oxygenated hemoglobin proportion in blood), spirometers (for measuring air capacity of the lungs), and/or sensors for measuring international normalized ratio of prothrombin time (PT/INR).

These physiological sensors provide physiological data to the expansion port 534, which is optionally processed by the processor 502 and stored in the storage device 520. This information can be retrieved by a wireless device connected to the wireless LAN transceiver 508, or may be available through the Internet via the wireless WAN transceiver 514. The expansion port 534 may include ADCs to convert analog data from sensors into digital data. In addition, the expansion port 534 may include preamplifiers to boost the amplitude of incoming analog signals and/or level shifters to receive digital signals from a wide variety of digital logic families.

Physiological sensors 550 may alternately communicate with the wireless LAN transceiver 508 if they have wireless capability. The input device 518 may allow users to, for example, enter how often certain readings are to be taken or identify the various sensors connected to the expansion port 534. Data being recorded, data that has previously been recorded, information pertaining to when data should be uploaded, and interpretations of readings can be conveyed to the user via the display 516. Additionally, an optional secure web server allows physiological data to be accessed remotely, such as by clinician or hospital staff.

The portable access point 500 may additionally include a GPS (Global Positioning System) receiver 556 having an optional external antenna 558. When the processor 502 detects an alarm condition, the processor 502 can obtain the current physical location of the portable access point 500 using the GPS receiver 556. The alarm condition may be derived from abnormal readings from a physiological sensor 550, or from manual input from the user, such as to the input device 518. The processor 502 may periodically update its physical location information, so that if the GPS receiver cannot locate a signal (such as when inside), at least recent position information is available.

Upon detecting the alarm condition, the processor 502 generates an alarm message that contains the position information. The position information can help Emergency Medical Services to locate the patient. The alarm message may also include stored patient information, and historical and/or current physiological sensor 550 readings. The portable access point 500 then sends the alarm message wirelessly to a pre-programmed address. The alarm message is preferably encrypted, and may be sent in any suitable format (e.g., Short Message Service text message, email, eXtensible Markup Language message, etc.). The alarm message may also contain authentication information to prevent forged alarm messages.

Those skilled in the art can now appreciate from the foregoing description that the broad teachings of the present disclosure can be implemented in a variety of forms. Therefore, while particular examples have been described, the true scope of the disclosure should not be so limited since other modifications will become apparent to the skilled practitioner upon a study of the drawings, the specification and the following claims.

What is claimed is:

1. A portable access point comprising:
    an expansion port configured to receive data, associated with a user, from a physiological sensor or a physiological recorder;
    a first transceiver configured to access an Internet via a mobile phone, wherein the first transceiver is separate from the mobile phone, wherein the first transceiver receives signals transmitted from the mobile phone to the portable access point, and wherein the signals contain content received from the Internet;
    a second transceiver;
    a routing module configured to (i) route the content from the first transceiver to the second transceiver, and (ii) route the data to (a) the mobile phone via the first transceiver or (b) a first network device of a plurality of network devices via the second transceiver, wherein the portable access point, via the routing module, facilitates communication between (i) the first network device and (ii) a wireless service provider or a second network device of the plurality of network devices,
    wherein the second transceiver is configured to (i) respectively establish a plurality of wireless links between the portable access point and the plurality of network devices, (ii) select the first network device from the plurality of network devices, and (ii) forward the content from the portable access point to one of the plurality of network devices on one of the plurality of wireless links respectively established between the portable access point and the one of the plurality of network devices;
    a portable power source configured to provide power for the portable access point; and
    a processor configured to
        determine whether packets have not been received from the mobile phone for more than a predetermined period,
        transition to a sleep mode in response to determining that packets have not been received from the mobile phone for more than the predetermined period,
        determine a state of charge of the portable power source, and
        adjust the sleep mode based on the state of charge,
    wherein the first transceiver is configured to, while in the sleep mode, suspend communication with the mobile phone.

2. The portable access point of claim 1, wherein the first transceiver is configured to establish a data service with an Internet service provider via the mobile phone to access the content from the Internet.

3. A portable access point comprising:
    a first transceiver configured to (i) access an Internet via a mobile phone, wherein the first transceiver is separate from the mobile phone, wherein the first transceiver receives signals transmitted from the mobile phone to the portable access point, and establish a data service with an Internet service provider via the mobile phone to access content from the Internet, and wherein the signals contain the content received from the Internet;
    a second transceiver;
    a routing module configured to route the content from the first transceiver to the second transceiver,
    wherein the second transceiver is configured to (i) respectively establish a plurality of wireless links between the portable access point and a plurality of network devices, (ii) select a first network device of the plurality of network devices, and (ii) forward the content from the portable access point to the first network device on the wireless link respectively established between the portable access point and the first network device;
    a portable power source configured to provide power for the portable access point; and
    a processor configured to
        determine whether packets have not been received from the mobile phone for more than a predetermined period,
        transition to a sleep mode in response to determining that packets have not been received from the mobile phone for more than the predetermined period,
        determine a state of charge of the portable power source, and
        adjust the sleep mode based on the state of charge,
    wherein the first transceiver is configured to, while in the sleep mode, suspend communication with at least one of the mobile phone or the Internet service provider.

4. The portable access point of claim 1, further comprising a firewall configured to translate network addresses for the plurality of network devices.

5. The portable access point of claim 1, further comprising a dynamic host configuration protocol server configured to lease an Internet protocol address to one of the plurality of network devices.

6. The portable access point of claim 1, wherein the portable power source is configured to provide power to a battery-powered device external to the portable access point.

7. The portable access point of claim 1, further comprising a mounting device for attaching the portable access point to the user.

8. The portable access point of claim 1, further comprising a radio tuner, wherein the processor is configured to (i) receive media information from the radio tuner, and (ii) record or stream the media information.

9. A method comprising:
receiving at an expansion port of a portable access point data, associated with a user, from a physiological sensor or a physiological recorder;
accessing an Internet at a first transceiver and via a mobile phone including receiving signals at the first transceiver transmitted from the mobile phone to the portable access point, wherein the first transceiver is separate from the mobile phone, and wherein the signals contain content received from the Internet;
routing the content from the first transceiver to a second transceiver;
routing the data to (i) the mobile phone via the first transceiver, or (ii) a first network device of a plurality of network devices via the second transceiver, wherein the portable access point facilitates communication between (i) the first network device and (ii) a wireless service provider or a second network device of the plurality of network devices;
at the second transceiver,
respectively establishing a plurality of wireless links between the portable access point and the plurality of network devices,
selecting the first network device from the plurality of network devices, and
forwarding the content from the portable access point to the first network device on the wireless link respectively established between the portable access point and the first network device;
establishing, at the first transceiver, a data service with an Internet service provider via the mobile phone to access the content from the Internet;
providing power for the portable access point via a portable power source, wherein the portable power source is implemented in the portable access point;
determining whether packets have not been received from the mobile phone for more than a predetermined period;
transitioning to a sleep mode in response to determining that packets have not been received from the mobile phone for more than the predetermined period;
while in the sleep mode, suspending communication between the first transceiver and at least one of the mobile phone or the Internet service provider;
determining a state of charge of the portable power source; and
adjusting the sleep mode based on the state of charge.

10. A method comprising:
receiving data at an expansion port of a portable access point, wherein the data is associated with a user and is from a physiological sensor or a physiological recorder;
accessing an Internet at a first transceiver and via a mobile phone including receiving signals at the first transceiver transmitted from the mobile phone to the portable access point, wherein the first transceiver is separate from the mobile phone, and wherein the signals contain content received from the Internet;
routing the content from the first transceiver to a second transceiver;
routing the data to (i) the mobile phone via the first transceiver, or (ii) one of a plurality of network devices via the second transceiver; and
at the second transceiver,
respectively establishing a plurality of wireless links between the portable access point and the plurality of network devices,
selecting a first network device of the plurality of network devices, wherein the first network device is the one of the plurality of network devices or another one of the plurality of network devices, and
forwarding the content from the portable access point to the first network device on the wireless link respectively established between the portable access point and the first network device;
providing power for the portable access point via a portable power source, wherein the portable power source is implemented in the portable access point;
determining whether packets have not been received from the mobile phone for more than a predetermined period;
transitioning to a sleep mode in response to determining that packets have not been received from the mobile phone for more than the predetermined period;
while in the sleep mode, suspending communication between (i) the first transceiver and (ii) the mobile phone or an Internet service provider;
determining a state of charge of the portable power source; and
adjusting the sleep mode based on the state of charge.

11. The method of claim 9, further comprising providing power from the portable power source to a battery-powered device external to the portable access point.

12. The method of claim 9, further comprising, at the portable access point, translating network addresses for the plurality of network devices via a firewall.

13. The method of claim 9, further comprising, at the portable access point, leasing an Internet protocol address to one of the plurality of network devices via a dynamic host configuration protocol server.

14. The method of claim 9, further comprising:
receiving media information at the portable access point via a radio tuner;
receiving the media information from the radio tuner; and
recording or streaming the media information.

15. The portable access point of claim 1, wherein the expansion port is connected to and configured to receive the data, associated with the user, from the physiological sensor.

16. The portable access point of claim 1, wherein the routing module is configured to route the data to the mobile phone via the first transceiver.

17. The portable access point of claim 1, wherein the routing module is configured to route the data to the one of the plurality of network devices via the second transceiver.

18. The portable access point of claim 1, wherein the portable access point, via the routing module, facilitates communication between the first network device and the second network device over a local area network including transferring Ethernet packets between the first network device and the second network device via the local area network.

19. The portable access point of claim 1, wherein the portable access point, via the routing module, facilitates communication between the first network device and the wireless service provider over a local area network and a wide area network including transferring Ethernet packets between the first network device and the wireless service provider via the local area network and the wide area network.

20. The portable access point of claim 19, wherein the portable access point uses the mobile phone as a data service conduit to the wireless service provider.

\* \* \* \* \*